United States Patent [19]
Bernard et al.

[11] Patent Number: 6,045,077
[45] Date of Patent: Apr. 4, 2000

[54] FISHING REEL WITH REAR DRAG AND INTERCHANGEABLE LINE RESERVE

[75] Inventors: Jean Bernard, Scionzier; Frederic Platel, Marignier, both of France

[73] Assignee: Mitchell Sports, Marignier, France

[21] Appl. No.: 09/111,207

[22] Filed: Jul. 7, 1998

[51] Int. Cl.[7] .................................................. A01K 89/01
[52] U.S. Cl. .......................... 242/314; 242/318; 242/322
[58] Field of Search .................................... 242/322, 317, 242/318, 230, 231, 232, 233, 314

[56] References Cited

U.S. PATENT DOCUMENTS

| | | |
|---|---|---|
| 2,312,899 | 3/1943 | Hamburger . |
| 2,755,037 | 7/1956 | Sarah . |
| 2,942,799 | 6/1960 | Meulnart . |
| 3,565,362 | 2/1971 | Lillard . |
| 3,682,411 | 8/1972 | Dumbauld . |
| 3,693,901 | 9/1972 | Lilland et al. . |
| 3,870,245 | 3/1975 | Witteborg, Jr. . |
| 3,979,082 | 9/1976 | Morishita . |
| 4,106,718 | 8/1978 | Catignani . |
| 4,216,921 | 8/1980 | Puryear . |
| 4,327,880 | 5/1982 | Dorbandt . |
| 4,651,945 | 3/1987 | Ruin . |
| 5,078,334 | 1/1992 | Zanon . |
| 5,120,003 | 6/1992 | Sacconi . |
| 5,333,813 | 8/1994 | Hirano . |
| 5,372,322 | 12/1994 | Fortson . |
| 5,456,418 | 10/1995 | Hitomi . |
| 5,513,813 | 5/1996 | Bernard et al. . |
| 5,573,193 | 11/1996 | Bernard et al. . |
| 5,603,465 | 2/1997 | Henriksson . |
| 5,607,114 | 3/1997 | Henriksson . |
| 5,755,391 | 5/1998 | Sacconi . |

FOREIGN PATENT DOCUMENTS

| | | |
|---|---|---|
| 125763 | 10/1947 | Australia ............................... 242/322 |
| 999 270 | 1/1952 | France . |
| 1 006 860 | 4/1952 | France . |
| 1 020 118 | 2/1953 | France . |
| 1 169 240 | 12/1958 | France . |
| 0 212 063 | 3/1960 | France . |
| 1 376 793 | 9/1964 | France . |
| 1 268 255 | 6/1969 | United Kingdom . |

OTHER PUBLICATIONS

Mitchell Quartz; 22 pages (pamphlet) ; Efttex Amsterdam: Jun. 28, 29, 30, 1996.

*Primary Examiner*—Katherine A. Matecki
*Attorney, Agent, or Firm*—Foley & Lardner

[57] ABSTRACT

The reel according to the invention comprises a spool support shaft that is held in a reel housing by its rear section and supports a front hub that comprises a front cylindrical coaxial barrel connected by means of a shoulder to a coaxial rear skirt. A line supply extends onto the front cylindrical coaxial barrel of the front hub and locks by means of an axial hole. The line supply comprises a solid front wall, blocking the axial hole toward the front.

25 Claims, 4 Drawing Sheets

FISHING REEL WITH REAR DRAG AND INTERCHANGEABLE LINE RESERVE

FIELD OF THE INVENTION

This invention pertains to fishing reels of the type having a fixed spool on a front-rear axis and a rotary line pick up around the front-rear axis, the axis of the spool engaging in a front-rear alternate translational movement during retrieval of the line.

BACKGROUND OF THE INVENTION

We are already familiar with these types of reels which are described in documents FR 1 376 793 A, FR 1 169 240 A or GB 1 268 255 A, for example, in which a spool support shaft is held in a reel housing by its rear section, and a front hub is supported by the spool support shaft and comprises a front cylindrical coaxial barrel connected to a rear shoulder of a larger diameter. A line supply shaped like a spool is formed by a one piece cast, the circumference of which is shaped as a groove for receiving the line, said groove being limited by a front flange and by a rear flange. The central section of the line supply features an axial passage hole for the purpose of engaging and locking onto the front cylindrical coaxial barrel of the front hub in a reversible manner. The hub can turn around the shaft, and can be slowed and stopped by a spool brake controlled with an adjustment knob that is accessible from the front through the front opening of the axial hole of the line supply.

In document FR 1 376 793 A the type of spool is enveloped, this means that its rear flange engages a cylindrical section of a line retrieval drum. The removal of the spool requires the use of a flexible fastener. In document GB 1 268 255 A the spool is also enveloped and its removal requires the removal of the front brake control knob. In document FR 1 169 240 A the line supply can be adjusted on the hub through a bayonet system.

The document FR 1 212 063 describes another design for a reel with an enveloping spool made of a one piece cast screwed on a hub with a front brake. The removal of the spool requires locking the brake.

The use of an adjustment knob always causes the risk for having dust and water enter the reel that could interfere with the operation of the reel.

The same disadvantages are found with reels having a rear brake and an interchangeable spool, in which a front knob that is used for unlocking the spool is accessible from the front.

In addition, we notice that play exists between the spool and the spool support shaft, causing winding unevenness on the spool while the line is retrieved.

We also know, from the description in document FR 2 571 930 A, of an interchangeable spool for a reel with a front side formed by a flexible and waterproof membrane that ensures the operation of a knob used for unlocking the spool. This design is expensive.

SUMMARY OF THE INVENTION

The challenge suggested by this invention is to improve the protection of internal components of the reel against dust and water.

The invention aims at simplifying the design of the reel to reduce the cost of the interchangeable component that forms the basis of the line supply while increasing its sturdiness.

Another advantage sought with some methods of implementation for the invention is the reduction of the risk of the line getting caught on the front section of the spool during the operation of the reel.

To reach these objectives and others, the invention suggests a fishing reel with a spool and a line pick up that comprises the following:

a spool support shaft that is held in a reel housing by its rear section, a front hub supported by the spool support shaft that comprises a front cylindrical coaxial barrel connected through a shoulder to a coaxial rear skirt with a larger diameter, at least a line supply formed by a one piece cast, the circumference of which is shaped as a groove for receiving the line, said groove being limited by a front flange and by a rear flange, and the central section of which features an axial hole to engage and lock onto the front cylindrical coaxial barrel of the front hub in a reversible manner;

the line supply comprises a solid front wall that blocks the axial hole toward the front.

The structure of the interchangeable line supply that is entirely a one piece cast is particularly simple and inexpensive, it requires less material while being sturdy.

The solid front wall for line supply preferably has a convex shape that is slightly prominent and evenly rounded, forming a smooth front side and having no unevenness, so that the line can not get caught.

With this particularly inexpensive solution we prevent any risk of the line getting caught on the front side of the spool.

According to a preferred method of implementation that primarily facilitates the molding of parts and prevents the line from getting caught on the rear flange of the spool:

the rear flange of the line supply is connected on its circumference to a rear ring-shaped lip, the shoulder of the front hub comprises a front peripheral ring-shaped rabbet, the rear lip and the rabbet are formed such that when in the assembled position of the line supply on the front hub, the rear lip goes in the rabbet with its rear side resting against the front side of the rabbet, with its peripheral side slightly set back radially or flush with the peripheral side of the rear skirt, with axial play between the rear side of the rear flange of the line supply and the front side of the front hub shoulder.

Other objectives, characteristics and advantages of this invention will be elaborated in the following description for the specific methods of implementation, by referring to the appended figures. in which:

DETAILED DESCRIPTION OF THE PREFERRED EMBODIMENT

Figure 1:
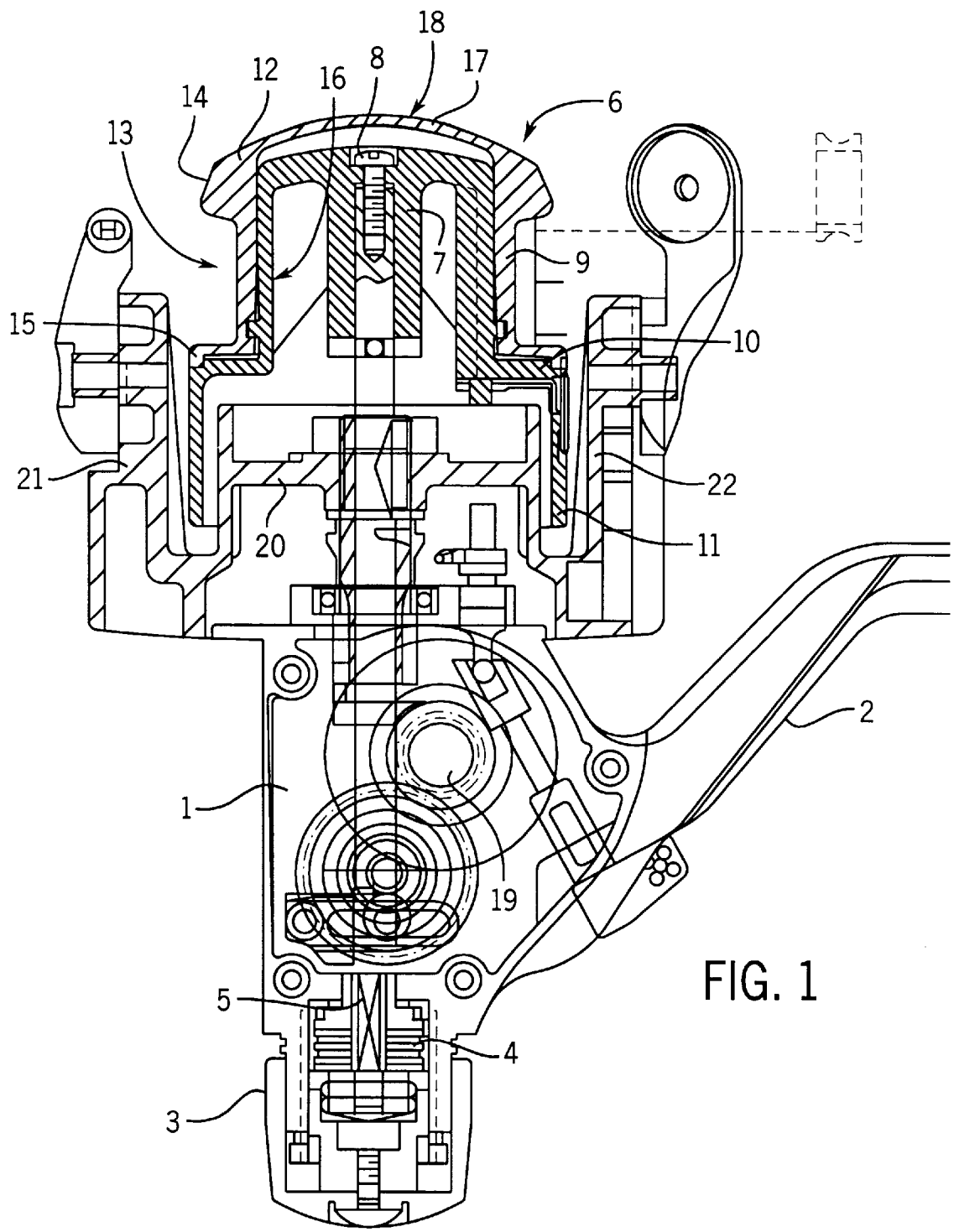
FIG. 1 is a side view in a longitudinal cross section of a fishing reel according to a method of implementation for this invention.
Figure 2:
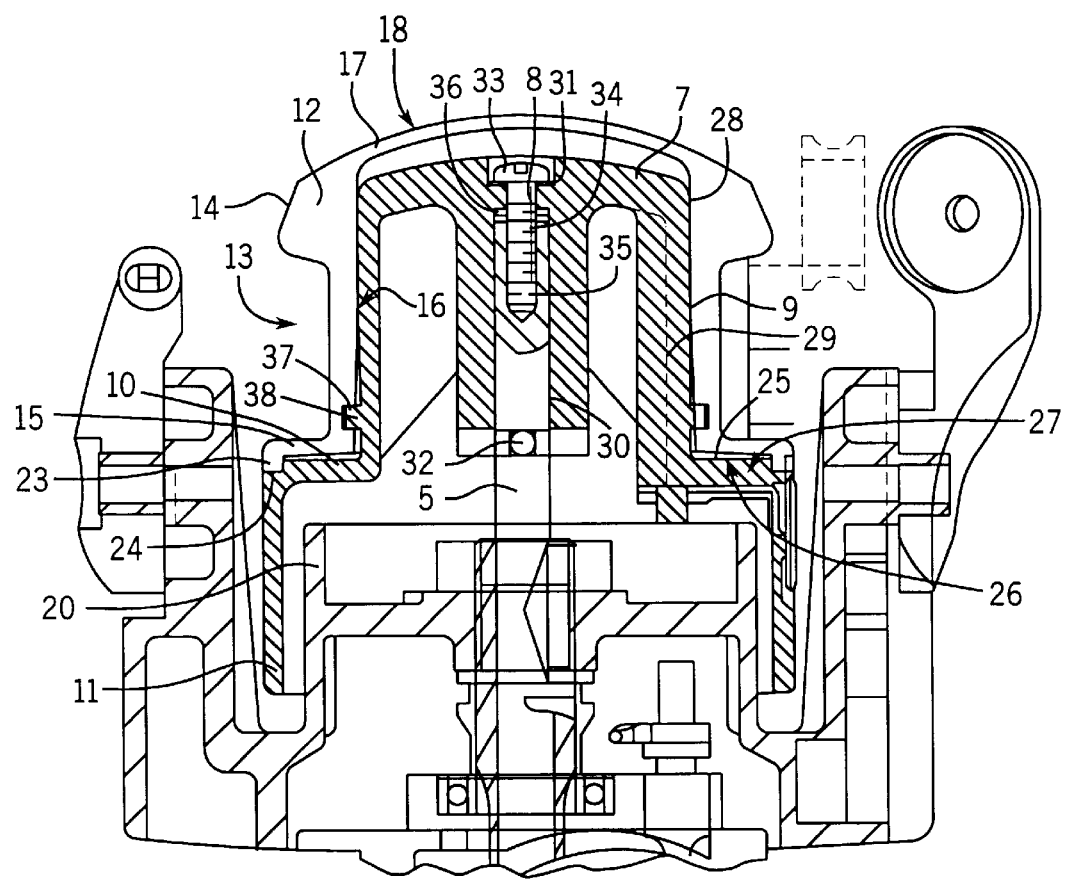
FIG. 2 is a partial side view in a longitudinal cross section in a larger scale of the front section of the reel from FIG. 1.

In the method of implementation illustrated in FIG. 1, and in a larger scale in FIG. 2, a reel according to the invention comprises a reel housing (1), forming a hollow structure with a foot (2) for fastening on a fishing rod. On the rear section of the housing (1), a drag knob (3) sets the rear brake that comprises a standard stack of washers (4) for adjusting the braking torque applied to a spool support shaft (5) mounted so as to rotate. The spool support shaft (5) is held in the reel housing (1) by its rear section, and protrudes from the housing (1) on its front section that supports the spool (6).

A front hub (7) is supported by the spool support shaft (5), onto which it is fixed with a fastening screw (8).

The front hub (7) comprises a front coaxial cylindrical barrel (9) connected through a shoulder (10) to a coaxial rear skirt (11) with a larger diameter.

The spool (6) is formed by the assembly of the front hub (7) and a line supply (12) formed by a one piece cast, the circumference of which is shaped as a groove (13) for receiving the line, said groove being limited by a front flange (14) and by a rear flange (15). The central section of the line supply (12) features an axial hole (16) to engage and lock onto the front coaxial cylindrical barrel (9) of the front hub (7) in a reversible manner.

The line supply (12) comprises a solid front wall (17) that blocks the axial hole (16) toward the front.

In the method of implementation illustrated in FIGS. 1 and 2, the solid front wall (17) of the line supply has a convex shape that is slightly prominent and evenly rounded, forming a smooth front side (18) without unevenness, so that the line can not get caught.

The reel is operated by means of a standard crank handle, not illustrated in FIG. 1, that swivels on a transverse shaft (19), and engages the spool support shaft (5) in an alternate longitudinal translational movement by means of a standard mechanism. The mechanism engages a pick up drum (20) in rotation around the spool support shaft (5) at the same time. The pick up drum (20) comprises two front arms (21 and 22) that support a retractable bail arm which gradually winds the line in the groove (13) of the line supply (12) when the pick up drum (20) is in rotation.

As we can see in greater detail in FIG. 2, the rear flange (15) of the line supply (12) is connected on its circumference to a rear ring-shaped lip (23) that is preferably shaped as a coaxial cylinder. The shoulder (10) of the front hub (7) comprises a front peripheral ring-shaped rabbet (24). The rear lip (23) and the rabbet (24) are formed so that in the assembled position of the line supply on the front hub (7), as illustrated in FIG. 2, the rear lip (23) goes into the groove (23) with its rear side resting against the front side of the rabbet (24).

Some axial play (25) is prefered between the rear side (26) of the rear flange (15) of the line supply (12) and the front side (27) of the hub (7) shoulder (10).

In addition, as we can see in FIG. 2, the front section (28) of the cylindrical barrel (9) is inserted without play in the bottom of the axial hole (16) of the line supply (12), while the rear section (29) of the cylindrical barrel (9) is inserted with slight radial play in the hole (16), so that the radial support of the line supply (12) is ensured by the front section (28) of the cylindrical barrel (9) and by the rear lip (23) inserted in the rabbet (24).

The outside diameter of the rear lip (23) is preferably at most equal to the diameter of the rear skirt (11), so that the peripheral side of the rear lip (23) is slightly set back radially or flush with the peripheral side of the rear skirt (11).

In order to assemble the front hub (7) on the spool support shaft (5) by means of a fastening screw (8), the front hub (7) has an axial passage hole (30), with an intermediate narrow section (31) in which the front section of the spool support shaft (5) is inserted without play. The front end of the spool support shaft (5) rests against the rear side of the narrow section (31). A pin (32) ensures the rotational connection between the spool support shaft (5) and the hub (7). The axial fastening screw (8) has a head (33) that rests against the front side of the narrow section (31) and a rod (34) that is screwed in a tapped hole (35) of the end section of the spool support shaft (5).

A number of washers (36) can be interposed between the front end of the spool support shaft (5) and the rear side of the narrow section (31), in order to adjust the axial position of the front hub (7) and the line supply (12) on the spool support shaft (5). Therefore, we can easily adjust the axial position of the front hub (7) and the line supply (12) on the spool support shaft (5), in order to adjust the limits for the front-rear alternate movement of the line supply (12) in relation to the pick up drum (20). In this way we optimize the winding of the line.

To ensure the assembly of the line supply (12) on the hub (7), we provide at least one radial lug (37) that protrudes from the lateral surface of the cylindrical barrel (9), preferably in the rear section (29) of the cylindrical barrel (9), and at least a groove (38) positioned on the inside peripheral side corresponding to the axial hole (16) of the line supply (12).

Figure 3:
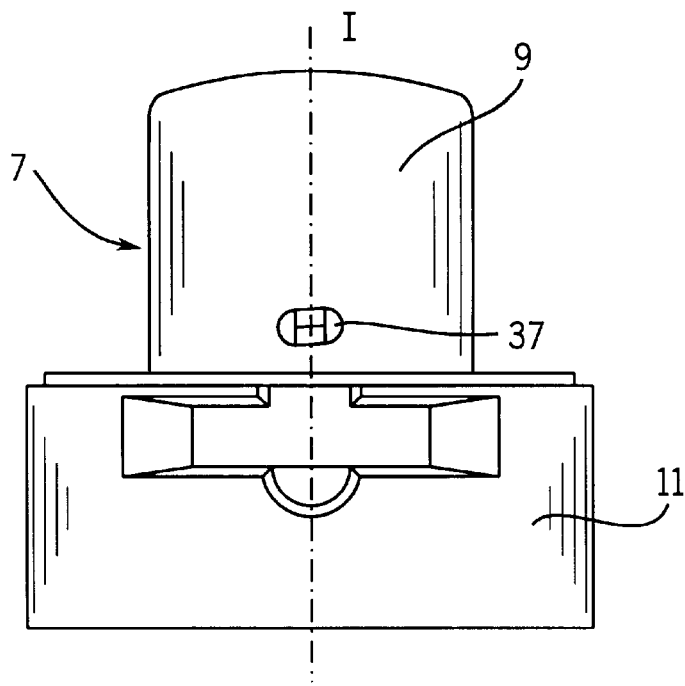
FIG. 3 is a top view of the front hub of the spool support shaft according to a method of implementation for this invention.
Figure 4:
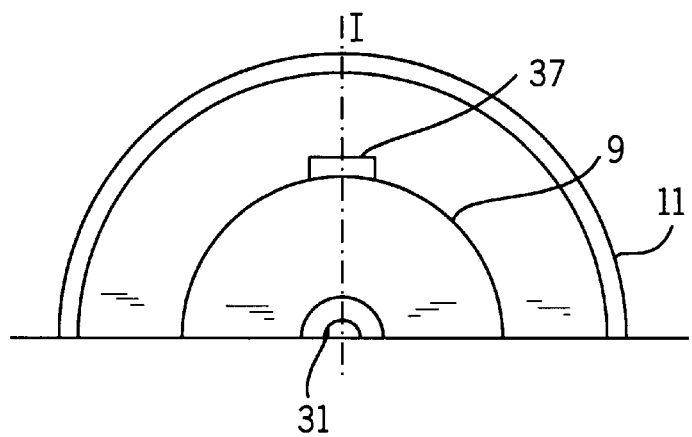
FIG. 4 is a half end view of the front hub from FIG. 3.

As can better be seen in FIGS. 3 and 4, the radial lug (37) may have an oblong section that is slightly inclined in relation to the longitudinal axis I—I.

Figure 5:
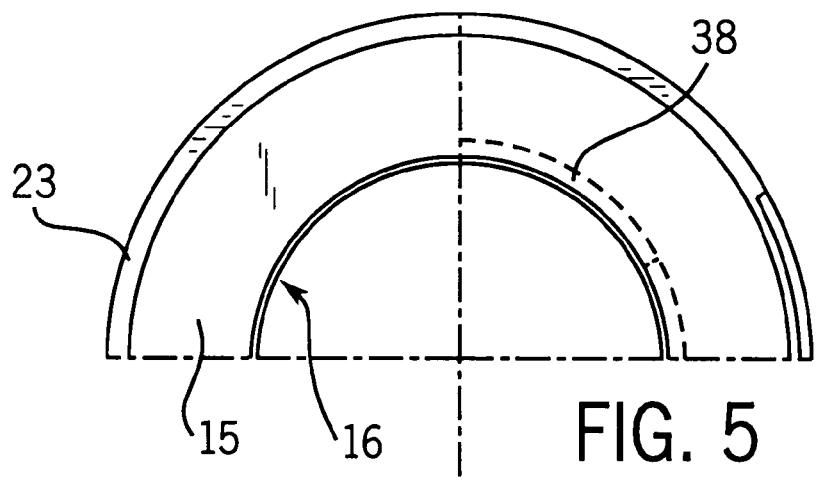
FIG. 5 is a half end view seen from the rear of the line supply according to the method of implementation of FIG. 2.
Figure 6:
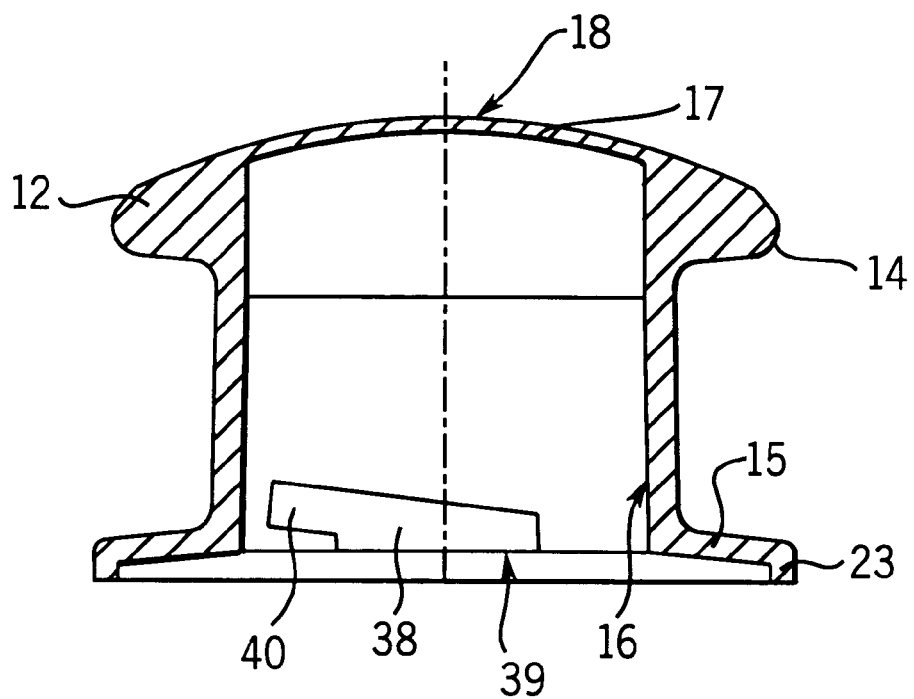
FIG. 6 is a top view in a longitudinal cross section of the line supply according to the method of implementation of FIG. 2.

As we can see better in FIGS. 5 and 6, the groove (38) opens onto the rear end (39) of the axial hole (16) of the line supply and comprises a helical front section (40) into which the lug (37) extends and locks when there is a relative movement of rotation of the line supply (12) around the hub (7).

In this way the lug (37) and the groove (38) are positioned so that the lug (37) goes into the beginning of the groove (38) by axial sliding of the line supply (12) on the hub (7). Then, when the line supply (12) is engaged in rotation around the hub (7), the lug (37) rests on the sides of the helical section (40) of the groove (38) forming an incline that forces the lip (23) into the rabbet (24), while the lug (37) rubs against the walls of the helical groove (40) and locks in the groove.

This invention applies to all types of fishing reels with a rear brake, a fixed spool and a rotary line pick up. But this invention applies preferably to reels with an enveloping spool, of which the rear skirt (11) of the hub covers the pick up drum (20) and is therefore accessible for locking the hub (7) during screwing and unscrewing of the line supply (12).

We understand that a structure as such for a reel ensures the elimination of all play between the spool support shaft (5) and the line supply (12), ensures the prevention of any risk for the line becoming caught during retrieval of the line, and ensures the easy adjustment for the limits of the front-rear alternate movement of the line supply in relation to the line pick up to optimize the winding of the line. In addition, the structure of the spool is practically waterproof and prevents dust and water from entering between the line supply (12) and the hub (7), which makes this device very reliable. The structure of the line supply (12) is also inexpensive, since it can be molded from plastic and is particularly sturdy since it has a solid front wall (17).

This invention is not limited to the methods of implementation that have been explicitly described, but it includes the various variants and generalizations contained in the following claims.

We claim:

1. A fishing reel comprising:
   a reel housing;
   a spool support shaft extending from the reel housing;
   a front hub supported by the spool support shaft, wherein the front hub includes a front cylindrical coaxial barrel having a first diameter, a coaxial rear skirt having a second larger diameter and a shoulder interconnecting the coaxial barrel and the coaxial rear skirt; and
   at least one line supply formed as a single unitary body, the line supply having a circumference, the circumference including a front flange, a rear flange and a central section extending between the front flange and the rear flange to form a groove adapted to receive fishing line, wherein the central section includes an axial hole receiving the front coaxial barrel of the front hub to removably mount said at least one line supply onto the front hub, wherein the line supply includes a substantially imperforate front wall blocking the axial hole.

2. The fishing reel of claim 1, wherein the front wall has a convex shape which is slightly prominent and evenly rounded to provide a smooth front side, whereby fishing line becoming caught upon the line supply is prevented.

3. The fishing reel of claim 1 wherein the rear flange includes an annular lip and wherein the shoulder includes an annular rabbet receiving the annular lip.

4. The fishing reel of claim 3 wherein the rear skirt has a peripheral side, wherein the rear flange has a rear side facing the front hub, wherein the front hub has a front side facing the rear flange, wherein the annular lip has a rear side and wherein the rabbet has a front side, wherein the annular lip and the rabbet are configured such that the rear side of the annular lip rests against the front side of the rabbet with the peripheral side of the annular lip extending along a radius less than or equal to a radius of the peripheral side of the rear skirt and so that axial play is created between the rear side of the rear flange and the front side of the front hub.

5. The fishing reel of claim 1 wherein the spool support shaft extends along an axis and wherein the front hub is [movably] coupled to the support shaft for releasable securement to the support shaft at a plurality of selected locations along the axis.

6. The fishing reel of claim 5 wherein the front hub is secured to the spool support shaft by a fastener.

7. The fishing reel of claim 5 including at least one spacer member removably positioned between the spool support shaft and the front hub, whereby at least one spacer member locates the front hub at one of the plurality of selected locations along the axis of the spool support shaft.

8. The fishing reel of claim 7 wherein the at least one spacer member comprises a washer between the spool support shaft and the front hub, wherein the front hub is secured to the spool support shaft by a fastener having a head abutting against the front hub and having a shaft extending through the front hub and extending through the spacer member to engage the spool support shaft.

9. The fishing reel of claim 1 wherein the central section about the axial hole includes one of a male member and a female member, wherein the coaxial barrel includes the other of the male member and the female member, and wherein the female member receives the male member to removably mount the at least one line supply onto the front hub.

10. The fishing reel of claim 9 wherein the female member receives the male member upon relative rotation of the central section and the coaxial barrel.

11. The fishing reel of claim 1 wherein the substantially imperforate front wall and the front flange are integrally formed as part of a single unitary body.

12. The fishing reel of claim 1 wherein the substantially imperforate front wall and the central section are integrally formed as part of an integral unitary body.

13. A fishing reel for use with a removable line supply, the fishing reel comprising:
   a reel housing;
   a spool support shaft extending from the reel housing along an axis;
   a pick up drum rotatably supported about the axis of the spool support shaft;
   a bail arm supported by the pick up drum; and
   a front hub supported by the spool support shaft, the front hub configured to carry the line supply, wherein the front hub includes a front cylindrical coaxial barrel having a first diameter, a coaxial rear skirt having a second larger diameter and a shoulder interconnecting the coaxial barrel and the coaxial rear skirt, and wherein the annular rear skirt axially overlaps the pick up drum;
   wherein the front cylindrical coaxial barrel, the coaxial rear skirt, and the shoulder are integrally formed as a single unitary body.

14. The fishing reel of claim 13 wherein the front hub is coupled to the support shaft for releasable securement to the support shaft at a plurality of selected locations along the axis.

15. The fishing reel of claim 14 wherein the front hub is secured to the spool support shaft by a fastener.

16. The fishing reel of claim 14 including at least one spacer member removably positioned between the spool support shaft and the front hub, whereby the at least spacer member locates the front hub at one of the plurality of selected locations along the axis of the spool support shaft.

17. The fishing reel of claim 16 wherein the at least one spacer member comprises a washer between the spool support shaft and in the front hub, wherein the front hub is secured to the spool support shaft by a fastener having a head abutting against the front hub and having a shaft extending through the front hub and extending through the spacer member to engage the spool support shaft.

18. A fishing reel for use with a removable line supply, the fishing reel comprising:
   a reel housing;
   a spool support shaft extending from the reel housing; and
   a front hub configured to support the removable line supply, wherein the front hub is coupled to the support shaft for releasable securement to the support shaft at a plurality of selected locations along the axis.

19. The fishing reel of claim 18 wherein the front hub is secured to the spool support shaft by a fastener.

20. The fishing reel of claim 18 including at least one spacer member removably positioned between the spool support shaft and the front hub, whereby the at least one spacer member locates the front hub at one of the plurality of selected locations along the axis of the spool support shaft.

21. The fishing reel of claim 20 wherein the at least one spacer member comprises a washer between the spool support shaft and the front hub, wherein the front hub is secured to the spool support shaft by a fastener having a head abutting against the front hub and having a shaft extending through the front hub and extending through the spacer member to engage the spool support shaft.

22. The fishing reel of claim 18 including a pick up drum rotatably supported about the axis of the spool support shaft, wherein the front hub includes an annular rear skirt axially overlapping the pick up drum.

23. A removable line supply for use with a fishing reel having a front hub extending along an axis, the line supply comprising:

a single unitary body having an annular side wall defining an outer circumferential groove adapted to receive fishing line and an inner axial hole having an opening through which the front hub is inserted into the axial hole to mount the line supply on the front hub, wherein the body includes an integrally formed substantially imperforate front wall obliquely extending from the annular side wall opposite the opening, whereby the substantially imperforate front wall protects internal components of the reel against dust and water.

24. The removable line supply of claim 23 wherein the front wall includes an outer convex surface to provide a smooth front side, whereby the smooth front side prevents fishing line from becoming caught upon the line supply.

25. A removable line supply for use with a fishing reel having a front hub extending along an axis, the line supply comprising:

a single unitary body having an annular side wall defining an outer circumferential groove adapted to receive fishing line and an inner axial hole having an opening through which the front hub is inserted into the axial hole to mount the line supply on the front hub, wherein the body includes an integrally formed substantially imperforate front wall extending non-parallel relative to the annular side wall opposite the opening, whereby the substantially imperforate front wall protects internal components of the reel against dust and water.

* * * * *